Figure 1:
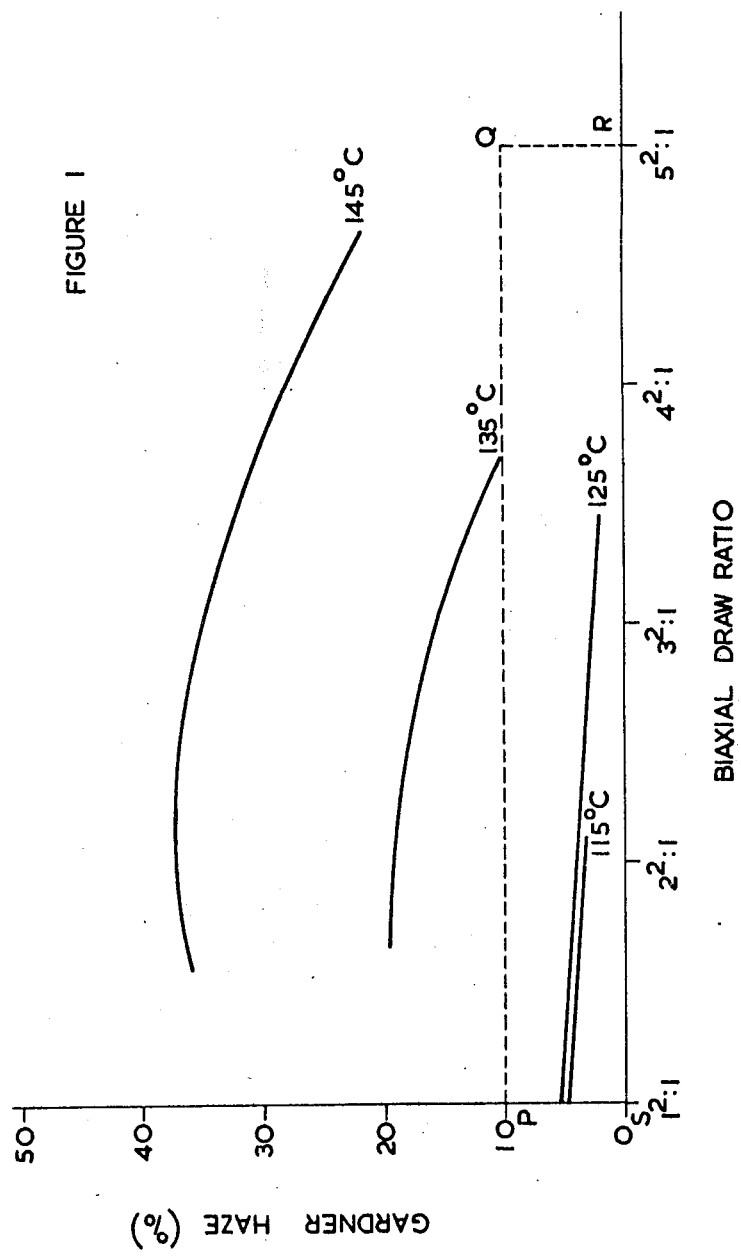

United States Patent [19]

Hicks

[11] 3,985,827

[45] Oct. 12, 1976

[54] ORIENTED FILMS FROM HIGH ACRYLONITRILE POLYMER COMPOSITIONS

[75] Inventor: Clive William Frederick Hicks, London, England

[73] Assignee: Imperial Chemical Industries Limited, London, England

[22] Filed: May 8, 1973

[21] Appl. No.: 358,347

[30] Foreign Application Priority Data

May 19, 1972 United Kingdom............. 23613/72
Aug. 31, 1972 United Kingdom............. 40319/72

[52] U.S. Cl............................. 260/876 R; 260/827; 260/829; 260/879; 260/880 R; 426/106
[51] Int. Cl.².................... C08L 51/00; C08L 53/00
[58] Field of Search.................... 260/876 R, 880 R

[56] References Cited
UNITED STATES PATENTS

| | | | |
|---|---|---|---|
| 3,451,538 | 6/1969 | Trementozzi | 260/876 R |
| 3,615,710 | 10/1971 | Lee et al. | 260/876 R |

FOREIGN PATENTS OR APPLICATIONS

| | | |
|---|---|---|
| 1,185,306 | 3/1970 | United Kingdom |
| 1,009,360 | 11/1965 | United Kingdom |
| 994,924 | 6/1965 | United Kingdom |

*Primary Examiner*—Richard B. Turer
*Attorney, Agent, or Firm*—Cushman, Darby & Cushman

[57] ABSTRACT

Oriented film is provided formed from a blend of a homogeneous copolymer resin derived from units of acrylonitrile (70 to 93% molar) and at least one aromatic olefine (30 to 7% molar) with a graft copolymer having a diene rubber substrate and a superstrate which is a homogeneous copolymer derived from units of acrylonitrile (70 to 93% molar) and at least one aromatic olefine (30 to 7% molar) the blend containing 5 to 15% by weight of rubber and the refractive indices of the substrate and superstrate being within 0.005 of that of the homogeneous copolymer resin, the film having a Gardner haze of less than 10% having been drawn in at least one direction to a ratio of at least 1.7:1 at a temperature of between 105° and 155°C.

5 Claims, 2 Drawing Figures

ORIENTED FILMS FROM HIGH ACRYLONITRILE POLYMER COMPOSITIONS

This invention relates to film and in particular to oriented film.

According to the present invention oriented film is provided having a Gardner haze of less than 10% having been drawn in at least one direction to a ratio of at least 1.7:1 at a temperature of between 105° and 155° C and formed from a blend of a homogeneous copolymer resin derived from units of acrylonitrile (70 to 93% molar) and at least one aromatic olefine (30 to 7% molar) with a graft copolymer having a diene rubber substrate and a superstrate which is a homogeneous copolymer derived from units of acrylonitrile (70 to 93% molar) and at least one aromatic olefine (30 to 7% molar) the blend containing 5 to 15% by weight of rubber and the refractive indices of the substrate and superstrate being within 0.005 of that of the homogeneous copolymer resin.

The aromatic olefine is selected from those of the formular $CH_2:CR.Ar$ and also acenaphthylene, indene and coumarone. In this formula R is hydrogen or methyl and Ar is an optionally ring-substituted residue of aromatic character having not more than 3 rings and each substituent (if any) having not more than 4 carbon atoms. Examples of such olefines include styrene, α-methylstyrene, o-methylstyrene, m-methyl styrene, p-methylstyrene, m-vinylphenol, p-trimethylsilylstyrene, 2,5-dimethylstyrene, p-methoxystyrene, 1-vinylnaphthalene, p-dimethylaminostyrene, p-acetamidostyrene, ar-dibromostyrene, 2-vinylthiophene, 3-vinylphenanthrene, N-vinylcarbazole and 2-methyl-5-vinylpyridine. The preferred composition is one in which styrene and/or α-methylstyrene is the predominant olefine.

The homogeneous copolymer resin and homogeneous copolymer superstrate are derived from at least 70% molar of units of acrylonitrile preferably more than 80% molar and most preferably more than 86% molar, and less than 93% molar of units acrylonitrile preferably less than 90% molar; the sum of units derived from acrylonitrile and aromatic olefine being 100% molar. Also it is preferable that the compositions of both the resin and the superstrate are the same but they may be different provided that their refractive indices differ by less than 0.005 units. The resins may be made for example by the methods described in British patent specification Nos. 663,268, 1,185,305 and 1,197,721.

The diene rubber contains from 40 to 100% molar of at least one conjugated 1,3-diene monomer and from 0 to 60% molar of at least one other ethylenically unsaturated monomer copolymerisable with free radical catalysts. Any diene rubber may be used as the substrate of the graft copolymer provided that its refractive index differs by less than 0.005 from that of the resin and superstrate. Suitable dienes include for example butadiene, isoprene, 2,3-dimethylbutadiene, piperylene and chloroprene. A wide variety of other monomers may be used, including aralkenes such as styrene and α-methylstyrene, esters of acrylic and methacrylic acids such as methyl, ethyl, n-butyl and 2-ethylhexyl acrylates and methyl and n-butyl methacrylates, esters of fumaric acid, and unsaturated nitriles such as acrylonitrile and methacrylonitrile; styrene and acrylonitrile are particularly convenient. The graft copolymer may be made by emulsion polymerization, for example by the methods described in British patent specification Nos. 1,185,306 and 1,197,721.

The blends used for the films of the invention may be made by mixing the resin and graft copolymer by any suitable means such as for example mixing latices of the graft copolymer and resin followed by addition of any additives, coagulation, washing and drying, or by powder mixing or mixing on a heated mill. The final blend should contain 5 to 15% by weight of rubber, preferably between 8 and 12% by weight.

The resin and superstrate may contain small amounts i.e. up to 10% molar but preferably less than 5% molar of units derived from ethylenically unsaturated monomers so as to modify their properties, for example cetyl vinyl ether to improve processability, vinyl pyridine to improve dyeability, maleimide, N-aryl maleimide norbornene and its derivatives to increase softening point (British patent specification Nos. 1,185,307 and 1,185,308), ester of acrylic and alkyl acrylic acids to modify refractive index.

The degree of polymerisation of the resin is preferably such that the copolymers have molecular weights equivalent to reduced viscosities of at least 0.5 but not more than 3 (preferably between 1 and 2), as measured on a solution of 0.5 g of the resin in 100 cm$^3$ of dimethylformamide at 25° C. For ease of fabrication, it is preferred to use resins having a melt viscosity of less than $10^5$ and preferably less than $10^4$ poises at 260° C when measured under a constant shear stress of $10^7$ dynes/cm$^2$. Desirably, the melt viscosity at 260° C is less than about 50 kP at a shear rate of 100/s and less than about 10 kP at a shear rate of 1000/s.

Films may be prepared from the blends by any process normally used in the art of shaping thermoplastic material; suitable methods include compression-moulding, melt-extrusion, calendering, or casting from a melt, from a solution of the polymer in a suitable solvent, for example acetone or dimethylformamide, or from latex. Where the film is formed from the copolymer by moulding or extrusion, temperatures of at least 150° C are generally required to obtain the material in a sufficiently mobile form. The use of temperatures above 300° C may result in chemical alteration of the polymer, evinced as a deepening yellow colour and probably caused by intramolecular ring-closure between adjacent acrylonitrile units in the polymer chain. Such chemical alteration, however, may sometimes be desirable. It may also be desirable to include in the film-forming composition other ingredients such as fillers, stabilisers, lubricants, slip and mould-release agents.

The films may be stretched by any suitable process, the method used depending largely on the process used for forming the film. For example, a film shaped by extrusion through a slot orifice may be cooled to the stretching temperature and passed through two sets of pinch rolls, the last rotating faster than the first. The degree of orientation will depend upon the relative rotational speeds of the two sets of rolls and the temperature of the film. This process achieves stretching in only one direction and the strength of the film is increased solely in that direction.

Stretching in two directions may be sequential or simultaneous. One suitable method for sequential orientation is to extrude the film through a slot orifice, draw it longitudinally by a pinch-roll system and then draw it laterally by means of pairs of clamps which are attached to the edges of the film and which are arranged to move apart as the film is led forward. The film is heated during the stretching steps for example by passing it over a heated roll or by means of hot inert gases or liquids or by infra-red heating.

A convenient method for orienting a film in two directions simultaneously is to extrude the molten polymer through an annular orifice to give a tube and to draw the tube lengthwise by flattening it and passing it through two sets of nip rolls, the second rotating faster than the first. The tube is simultaneously stretched by internal gas pressure created within the tube between the two sets of nip rolls. The presence of the first set of nip rolls also prevents the point of expansion moving backwards to a position at which the tube after extrusion is still at a temperature at which flow would occur to the detriment of orientation. Another method is to extrude the film from a slit orifice, cool it and grip each side of the cooled film by a number of pairs of clamps. The clamps are then drawn along a path such that those in each pair diverge laterally from each other and the distance between adjacent pairs is also increased, thus stretching the film laterally and longitudinally.

The films of the present invention are drawn in at least one direction at a temperature between 105° C and 155° C. Drawing at a higher temperature leads to increase in haze whilst only slight drawing is possible and hence only little improvement in physical properties is achieved by drawing at a temperature of less than 105° C. The draw ratio is at least 1.7:1 in one or two directions, the upper limit of draw ratio depending on the draw temperature being for example about 2:1 at 115° C, 3:1 at 125° C and 3.5:1 at 135° C for a film from a homogeneous copolymer resin and superstrate of acrylonitrile (87.5% molar) and styrene (12.5% molar), a diene rubber of butadiene (88% molar) and styrene (12% molar), the blend containing 10% by weight of rubber.

Figure 2:
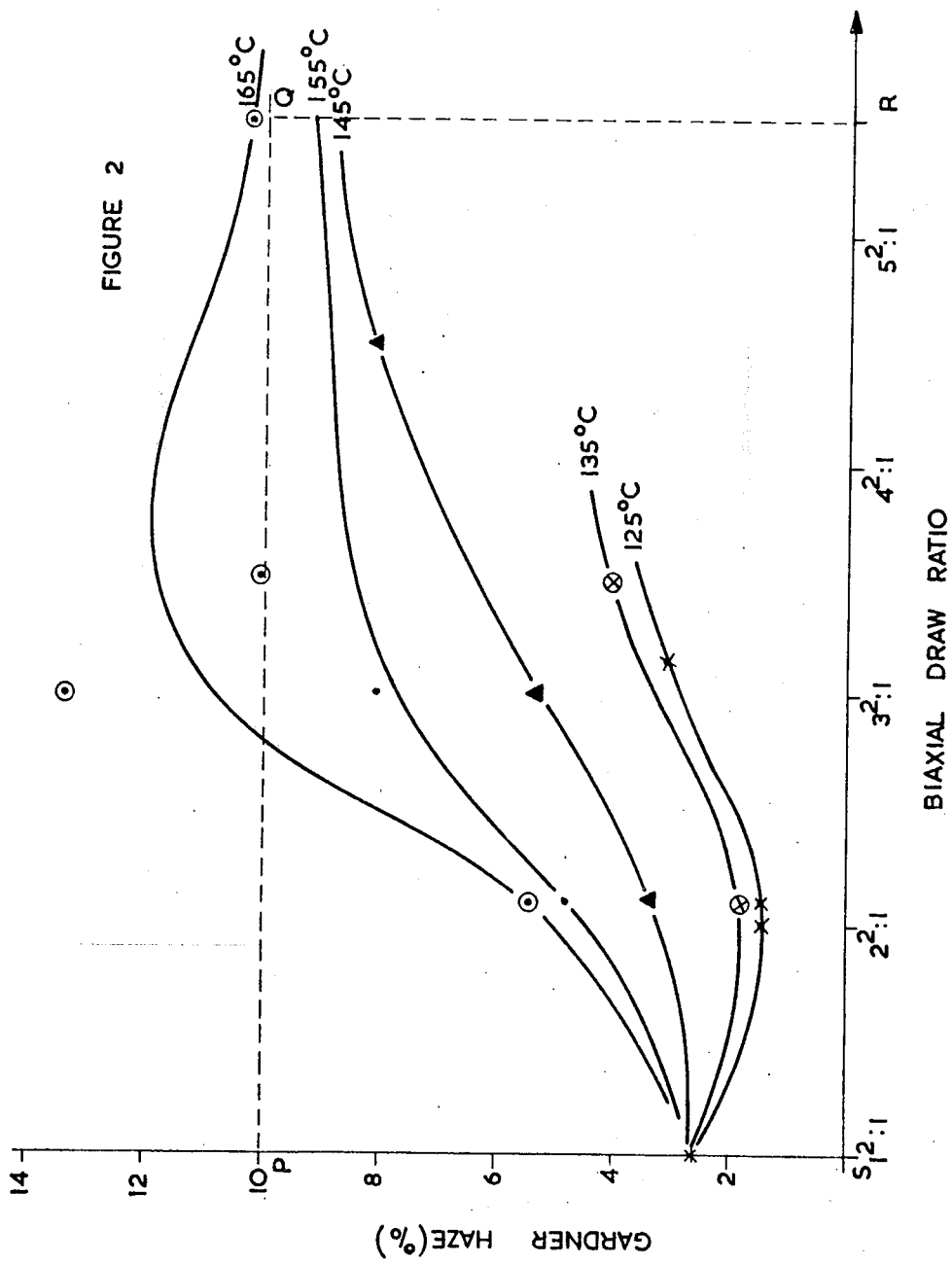

The haze appears to be very dependent on draw temperature as shown in accompanying FIGS. 1 and 2 but only slightly dependent on draw ratio and film thickness. The haze is also very dependent on the amount of emulsifier used in the preparation of the graft copolymer because the emulsifier generally remains in the isolated graft copolymer. Usually the greater the amount of emulsifier used in the grafting reaction, the more hazy is the oriented film therefrom. Hence in order to obtain film having least haze it is preferable to use a highly efficient emulsifier such as an alkyl benzene sulphonate in low concentration rather than a low efficiency emulsifier such as alkali metal salts of long-chain alkyl fatty acids which need higher concentration. This effect is shown in FIGS. 1 and 2 which correspond to use of sodium oleate and predominantly sodium alkyl benzene sulphonate respectively. Preferably the emulsifier content of the graft copolymer is less than 2% and that of the blend is less than 0.5% by weight.

The film of the invention is suitable for packaging applications, particularly as sealed package where it is desirable that ingress and egress of vapour and gases be kept to a minimum. The film is therefore suitable for packaging foodstuffs and medicines including carbonated drinks and water especially if the film is in the form of a sachet.

The invention is illustrated by the following examples.

EXAMPLE 1

A graft copolymer was prepared by a method similar to that described in Example 4 of British patent specification No. 1,185,306 by copolymerising acrylonitrile and styrene in the presence of a preformed diene rubber latex. The diene rubber latex contained 20.5% solids and the diene rubber made from butadiene (88% molar) and styrene (12% molar) had a refractive index 1.533. The diene rubber latex contained 7.5% by weight based on solids of a 1:1 blend by weight of sodium oleate and sodium stearate. A graft copolymer, having a superstrate containing randomly copolymerised acrylonitrile (87.5% molar) and styrene (12.5% molar) was made from an initial charge consisting of the above diene rubber latex (12.65 kg), styrene (33.5 g), acrylonitrile (2.61 kg). The procedure of Example 4 of British patent specification No. 1,185,306 was followed, but using dextrose (77 g); cumene hydroperoxide (56 g); ferrous sulphate (3.8 g) sodium pyrophosphate (19 g) and additional emulsifier sodium alkyl benzene sulphonate (1% by weight based on solids; "Nansa" HS 85/S, Marchon Ltd, Trade Mark). The rate of polymerisation was followed by calorimetry and styrene was fed to the reaction mixture so that the ratio of acrylonitrile to styrene in the mixture maintained its initial value. A further 1% of emulsifier ("Nansa" HS 85/S Marchon Ltd Trade Mark) (25 g in 200 cm$^3$ of water) was fed as a solution to the reaction mixture during the reaction. The reaction was terminated by adding 2,6-ditertiarybutyl-4-methyl phenol (259 g as 30% dispersion in water). The latex of the resulting graft copolymer contained 25.5% solids representing a conversion on solids of 91%; the rubber content of the graft was 48%, and the emulsifier content was 4.5%.

The above graft copolymer was latex blended with an acrylonitrile-styrene resin containing 87.5% molar acrylonitrile (refractive index 1.534) prepared by the method described in British patent specification No. 1,185,305 but using the acrylonitrile/styrene initial charge and styrene feed described above for the preparation of the graft copolymer to give a blend containing 10% by weight of rubber and 1.0% of emulsifier assuming that no emulsifier was present in the resin. The latices were coagulated using aqueous magnesium sulphate (1% w/v), the coagulate being filtered, washed with water and dried in a vacuum oven at 70° C.

Pieces of film were prepared from samples of the blend by compression moulding at 200° C. The pieces were then drawn biaxially at a range of temperatures and at different draw ratios and the results of physical testing and haze values are presented in Table 1.

TABLE 1

| Temp °C | Draw Ratio | Thickness μm | Yield Stress NM/m$^2$ (psi) | Break Stress NM/m$^2$ (psi) | Elongation at Break % | 1% Secant Modulus MN/m$^2$ (psi) | Gardner Haze % |
|---|---|---|---|---|---|---|---|
|  | Undrawn | 200 | 64.3 (9300) | 60.3 (8700) | 42 | 2140 (310000) | 5.2 |
| 105 | 1.7 × 1.7:1 | 140 | 80.3 (11600) | 125.0 (18100) | 73 | 2700 (390000) | 7.0 |

TABLE 1-continued

| Temp °C | Draw Ratio | Thickness μm | Yield Stress NM/m² (psi) | Break Stress NM/m² (psi) | Elongation at Break % | 1% Secant Modulus MN/m² (psi) | Gardner Haze % |
|---|---|---|---|---|---|---|---|
| 115 | 2.1 × 2.1:1 | 80 | 81.3 (11800) | 137.0 (19900) | 92 | 4020 (580000) | 2.0 |
| 125 | 3.1 × 3.1:1 | 50 | 87.0 (12600) | 198.3 (28800) | 86 | 2760 (400000) | 8.2 |
| 135 | 3.5 × 3.5:1 | 30 | 85.3 (12400) | 179.7 (26000) | 75 | 3070 (450000) | 13.0 |
| 145 | 4.5 × 4.5:1 | 20 | 79.3 (11500) | 142.0 (20600) | 76 | 2820 (410000) | 19.2 |
| 155 | 5.4 × 5.4:1 | 20 | 79.7 (11600) | 119.7 (17400) | 60 | 2770 (400000) | 33.0 |
| 165 | 5.5 × 5.5:1 | 15 | 78.0 (11300) | 91.7 (13300) | 60 | 3100 (450000) | 44.0 |

The results show that the haze value (% Gardner; ASTM D1003-61) increases rapidly when film is drawn at a temperature greater than 135° C.

In a further series of experiments, the variation of haze with draw ratio at 115°, 125°, 135° and 145° C was determined. The results are presented in Table 2 and again show that haze increases with draw temperature but also that haze varies only slightly with draw ratio.

TABLE 2

| Draw Temperature °C | Biaxial Draw Ratio | Gardner Haze % |
|---|---|---|
| 115 | 1.7:1 | 4.0 |
|  | 2:1 | 3.5 |
|  | 2.5:1 | Film broke |
| 125 | 1.7:1 | 4.5 |
|  | 2:1 | 4.0 |
|  | 2.5:1 | 3.0 |
|  | 3:1 | 2.5 |
|  | 4:1 | Film broke |
| 135 | 1.7:1 | 19.5 |
|  | 2:1 | 19.5 |
|  | 2.5:1 | 18.0 |
|  | 3:1 | 14.5 |
|  | 4:1 | Film broke |
| 145 | 1.7:1 | 36.5 |
|  | 2:1 | 38.0 |
|  | 2.5:1 | 37.0 |
|  | 3:1 | 35.0 |
|  | 4:1 | 28.0 |

The date of Table 2 is presented in accompanying FIG. 1, oriented film having characteristics within the area PQRS falling within the scope of the present invention.

EXAMPLE 2

The procedure of Example 1 was repeated except that the emulsifier present in the diene rubber latex was 1.7% by weight of "Nansa" HS 85/S based on solids content of 40% by weight and the emulsifier present at the start of the grafting reaction and fed to the reaction mixture during grafting was a 1:1 blend by weight of sodium oleate and sodium stearate (1% by weight based on the rubber latex solids content in each of the initial grafting reaction mixture and the feed). The emulsifier content of the graft copolymer was 1.8% and that of the blend was about 0.4% assuming that no emulsifier was present in the resin.

The results of Gardner Haze determinations on resulting films at various biaxial draw ratios are presented in Table 3.

TABLE 3

| Draw Temperature °C | Biaxial Draw Ratio | Gardner Haze % |
|---|---|---|
| — | Undrawn | 2.6 |
| 125 | 2.1:1 | 1.4 |
|  | 3:1 | 3.0 |
| 135 | 2.1:1 | 1.8 |
|  | 3.5:1 | 4.1 |
| 145 | 2.1:1 | 3.3 |
|  | 3:1 | 5.4 |
|  | 4.5:1 | 8.1 |
| 155 | 2.1:1 | 4.8 |
|  | 3:1 | 8.1 |
| 165 | 2.1:1 | 5.5 |
|  | 3:1 | 13.6 |
|  | 3.5:1 | 10.2 |
|  | 5.5:1 | 10.5 |

The data of Table 3 is presented in accompanying FIG. 2, oriented film having characteristics within the area PQRS falling within the scope of the present invention.

I claim:

1. An oriented film having a Gardner haze of less than 10% having been drawn in two directions to a ratio of at least 1.7:1 at a temperature of between 105° and 155° C and formed from a blend of:
   a. a homogeneous copolymer resin derived from units of acrylonitrile (70 to 93% molar) and at least one aromatic olefine (30 to 7% molar) selected from styrene and α-methyl styrene; with
   b. a graft copolymer having a diene rubber substrate and a superstrate which is a homogeneous copolymer derived from units of acrylonitrile (70 to 93% molar) and at least one aromatic olefine (30 to 7% molar) selected from styrene and α-methyl styrene, the blending containing 5 to 15% by weight of rubber and the refractive indices of the substrate and superstrate being within 0.005 of that of the homogeneous copolymer resin.

2. An oriented film according to claim 1 in which homogeneous resin and superstrate both contain units derived from acrylonitrile in concentration 86 to 90% molar.

3. An oriented film according to claim 1 in which an emulsifier present in the graft copolymer is sodium alkyl benzene sulphonate.

4. An oriented film according to claim 1 in which the rubber content of the blend is 8 to 12% by weight.

5. A package comprising oriented film as claimed in claim 1.

* * * * *